United States Patent [19]

Luebke et al.

[11] Patent Number: 4,898,151
[45] Date of Patent: Feb. 6, 1990

[54] HIGH HEATING EFFICIENCY DEEP FAT COOKING FRYPOT

[75] Inventors: Clement J. Luebke, Burlington, Vt.; Frank A. Slade, Mountain Top, Pa.; Gerald W. Sank, Pasadena, Md.; James T. Grob; George M. Price, both of Shreveport, La.; Elbert M. Hubbard, Dallas, Tex.

[73] Assignee: The Frymaster Corporation, Shreveport, La.

[21] Appl. No.: 209,280

[22] Filed: Jun. 20, 1988

Related U.S. Application Data

[63] Continuation-in-part of Ser. No. 550,995, Nov. 14, 1983, Pat. No. 4,751,915, which is a continuation of Ser. No. 264,370, May 18, 1981, abandoned.

[51] Int. Cl.⁴ .................................. A47J 27/00
[52] U.S. Cl. ..................... 126/391; 99/403; 219/325; 219/438
[58] Field of Search ............... 126/391, 387, 360 R, 126/343.5 R, 343.5 A; 99/403; 219/325, 326, 437, 438

[56] References Cited

U.S. PATENT DOCUMENTS

| | | | |
|---|---|---|---|
| 2,176,869 | 10/1938 | Childs | 53/7 |
| 2,429,360 | 10/1947 | Kells | 126/391 |
| 2,655,144 | 10/1953 | Keating | 126/391 |
| 3,640,208 | 2/1972 | Size | 99/408 |
| 4,289,477 | 9/1981 | Moore et al. | 431/171 |
| 4,418,682 | 12/1983 | Heller | 126/391 X |
| 4,602,612 | 7/1986 | Schwizer | 126/391 |
| 4,724,825 | 2/1988 | Fritsch et al. | 99/403 X |

Primary Examiner—Randall L. Green
Attorney, Agent, or Firm—Hubbard, Thurman, Turner, Tucker & Harris

[57] ABSTRACT

Cooking oil contained in a fuel-fired deep fat frypot is heated utilizing a recirculating flow of combustion gas produced by an induced flow fuel-air burner. A squirrel cage type centrifugal fan draws a fuel-air mixture inwardly through the burner into an inlet chamber in which the combustion gas is formed. The hot combustion gas is discharged from the fan into a supply chamber, flowed from the supply chamber into and through external heating passages extending rearwardly along the opposite exterior side surfaces of the frypot, and then enters an external heating passage extending along the rear frypot wall. From this rear passage the combustion gas is drawn forwardly through generally triangularly shaped heating tubes extending horizontally through the frypot cooking zone, into and through a return plenum, into the fan where it is mixed with a fresh supply of combustion gas from the inlet chamber, and is then discharged into the supply chamber. During burner operation excess combustion gas is discharged to atmosphere through an appropriate vent stack. A motorized inlet damper is mounted on the inlet plenum and is operable to admit ambient air thereinto to rapidly lower the recirculating gas temperature to prevent oil temperature overshoot. Rigid insulation material is positioned in lower interior portions of the heating tubes to increase the gas flow velocity therethrough and to shield the lower "cold zone" of the frypot from tube heat. In an alternate embodiment of the frypot the fuel-air burner is replaced with electric heating elements operatively disposed within the supply chamber.

9 Claims, 3 Drawing Sheets

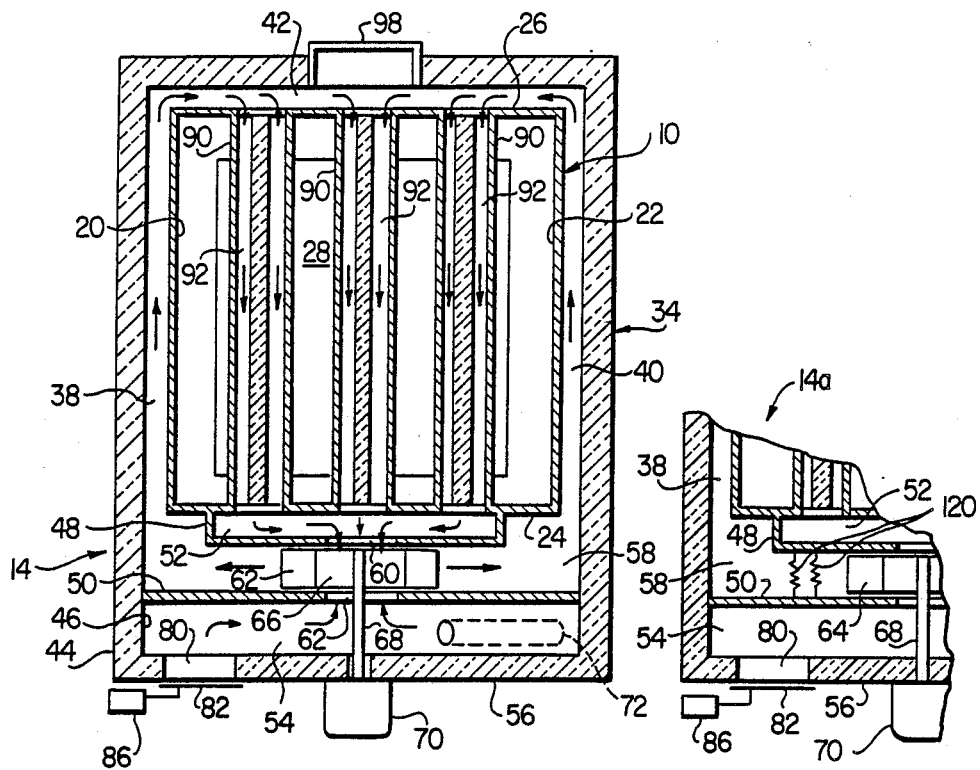
FIG. 4
FIG. 4A
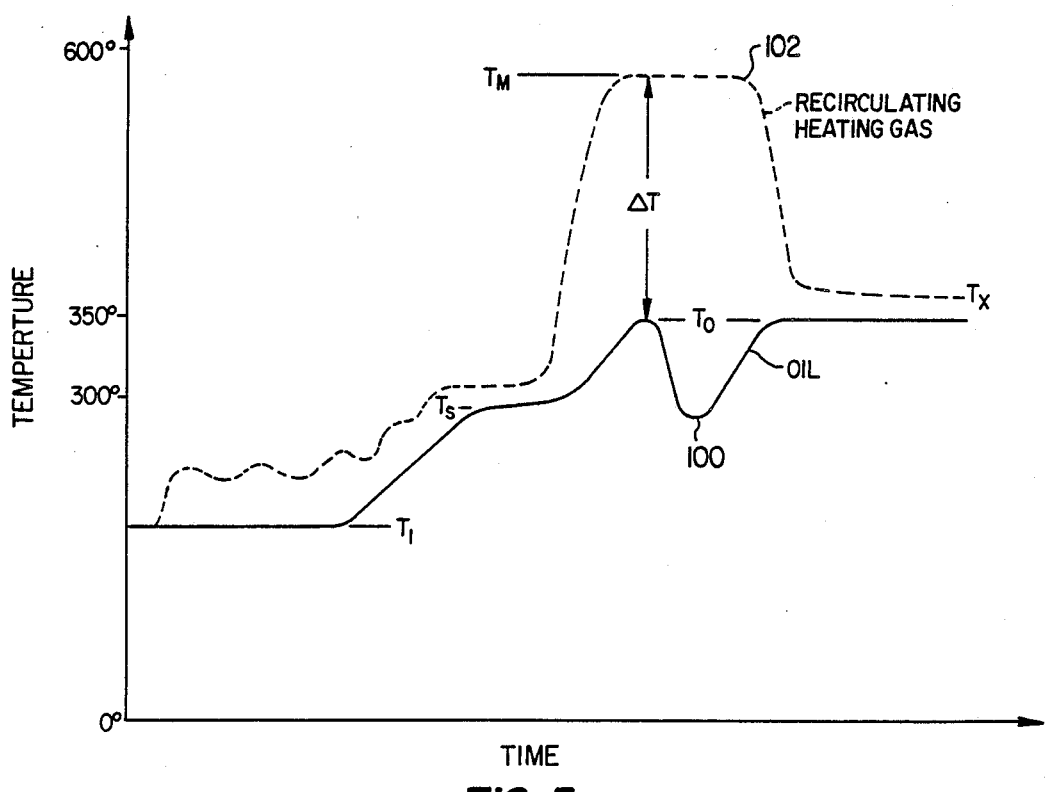
FIG. 5

HIGH HEATING EFFICIENCY DEEP FAT COOKING FRYPOT

CROSS-REFERENCE TO RELATED APPLICATIONS

This application is a continuation-in-part of U.S. Application Ser. No. 550,995, which was filed on Nov. 14, 1983, now U.S. Pat. No. 4,751,915, and is hereby incorporated herein by reference. U.S. Application Ser. No. 550,995 was a continuation of U.S. Application Ser. No. 264,370, filed on May 18, 1981, abandoned.

BACKGROUND OF THE INVENTION

The present invention relates generally to cooking apparatus and, in a preferred embodiment thereof, more particularly provides a large heating area deep fat cooking frypot in which the frypot cooking oil is heated utilizing a recirculating flow of heated gas.

Cooking oil frypots used to deep fry a variety of food products such as chicken, fish, french fries and the like are heated, among other known methods, by utilizing a throughflow of heated gas forced or drawn through exterior flow passages in thermal communication with wall portions of the frypot. The heating gas may be the combustion products emanating from an air-fuel burner, or may be electrically heated air. The conventional approach has been to simply flow the heating gas through the passageway system once—from its inlet to its outlet—and then exhaust the gas to atmosphere through an appropriate vent stack or the like. Not only does this approach waste potentially usable heating energy, but it also renders the desirably precise and uniform control of the cooking oil temperature within the cooking zone somewhat difficult to achieve.

As an example, particularly in larger volume frypots, the heating of only exterior wall portions of the frypot can result in rather significant cooking oil temperature variations between peripheral and central interior portions of the oil cooking zone within the frypot. Additionally, due to the fact that for a given frypot there is only a certain exterior wall area through which heat may be inwardly flowed, conventional "once through and dump" exterior heating schemes often lead to undesirably slow oil heating response times.

Another problem resulting from this conventional frypot oil heating technique is that of oil temperature "overshoot" when, for example, maximum heat input is used to bring the oil to its cooking temperature from a lower "standby" temperature. Unless the heat input is carefully controlled and timed (i.e., shut off or sharply reduced before the oil reaches its operating temperature), the oil temperature can significantly exceed the allowable maximum operating temperature thereof.

In order to diminish the oil heating response time in conventional fuel-fired frypots, great design care is used to assure that the flame emanating from the fuel-air burner contacts and extends along the maximum possible external surface area of the frypot to correspondingly maximize the combustion heat influx to the cooking oil. While this indeed accelerates the heating of the oil, it can also easily scorch the portion of the oil adjacent the interior cooking zone surface of the frypot when the temperature differential between the oil and the flame exceeds a critical maximum value. Great care must be taken to avoid this occurrence since it can ruin an entire batch of cooking oil. A complete solution to this conventional problem has proven to be rather elusive due to the very high flame temperatures typically involved.

In view of the foregoing, it is an object of the present invention to provide a deep fat cooking frypot having an improved oil heating system which eliminates or minimizes the above-mentioned and other problems, limitations and disadvantages typically associated with conventional frypot oil heating systems of the general type described.

SUMMARY OF THE INVENTION

In carrying out principles of the present invention, in accordance with a preferred embodiment thereof, a deep fat cooking frypot is provided with a fuel-fired recirculating heating system in which rigid insulation material is extended laterally around an upper exterior portion of the frypot to form side heating passages extending horizontally along opposite outer side surfaces of the frypot, a rear heating passage extending along the back of the frypot and communicating with rear end portions of the side passages, and an insulation-defined cavity extending along the front of the frypot and communicating with the front ends of the side heating passages.

Baffle means disposed in the front cavity subdivide it into an inlet plenum extending along the front of the cavity, a return plenum extending along a laterally central rear portion of the cavity, and a discharge plenum interposed between the inlet chamber and the return plenum and opening into the front ends of the side heating passage. Facing laterally central wall areas of the return plenum and inlet plenum are respectively provided with aligned discharge openings. A plurality of generally triangularly cross-sectioned heating tubes extend horizontally in a front-to-rear direction across the cooking zone of the frypot and interiorly define return flow passages extending from the rear heating passage into the return plenum.

The impeller of a motor driven squirrel cage centrifugal fan is positioned in the discharge plenum with the opposite sides of its central inlet opening aligned with and closely adjacent the facing discharge openings in the return and inlet plenums. Extending into the bottom of the front cavity is an induced draft fuel-air burner to which a fuel gas supply line having a motorized control valve therein is operatively connected, the burner having an electric igniter. An ambient air intake opening extends into the inlet plenum and may be selectively opened and closed by means of a motorized inlet damper operatively associated therewith.

During operation of the frypot heating system, the fan draws a fuel-air mixture inwardly through the burner which ignites the mixture and generates hot combustion gas into the inlet plenum. The hot combustion gas is drawn into the inlet plenum of the fan inlet opening and is discharged radially through the impeller into the discharge plenum. The hot gas entering the discharge plenum in this manner is sequentially forced rearwardly through the side heating passages, laterally inwardly through the opposite ends of the rear heating passage, and then forwardly through the heating tubes into the return plenum from which it is drawn into the return plenum side of the fan impeller inlet opening for mixture with the hot combustion gas entering the inlet plenum side of the impeller to be discharged therewith into the discharge plenum.

The discharge plenum, side and rear heating passages, heating tubes and return plenum thus define an overall heating passageway system through which this mixture of hot combustion gas initially entering the impeller from the burner, and returned to the impeller via the return plenum, is continuously recirculated. During fan and burner operation, excess gas in this recirculation path (generally equal in volume to the gas/air volume drawn inwardly through the burner) is discharged from the rear heating passage through a vent stack communicating therewith.

Hot combustion gas flowing from the discharge plenum through the balance of the heating gas recirculation flow path transfers heat to the cooking oil in the frypot cooking zone through a very high heat influx area defined by the walls of the heating tubes and front, rear and side wall portions of the frypot body, thus simultaneously heating both peripheral and interior portions of the oil to very evenly heat the oil in a manner substantially eliminating undesirable temperature gradients in the cooking zone portion thereof.

This unique recirculating heating gas flow also functions to desirably lessen the oil heating response time due to the aforementioned high heat influx area. Moreover, since the combustion gas returned to the fan is at a considerably lower temperature than the combustion gas initially drawn into the fan from the burner, the resulting gas mixture discharged by the fan into the discharge chamber is also at a significantly lower temperature than the combustion gas initially generated by the burner. Accordingly, the primary heat influx wall portions of the frypot are, in effect, shielded from the high flame temperature of the burner, the burner flame being isolated from such surfaces by the interposition of the return and discharge plenums between the inlet plenum (which serves as a combustion chamber) and the frypot body, and the "tempering" of the initially generated combustion gas arising from its mixture with return flow from the continuously recirculating combustion gas as previously described.

Such protective tempering greatly lessens the possibility that cooking oil at the periphery of the frypot interior will be scorched—even when the burner is operated at its maximum firing rate. This desirable tempering effect may be selectively augmented simply by opening the air inlet damper to cause a significantly larger amount of ambient air (i.e., beyond that drawn inwardly through the burner) to be drawn into the inlet chamber. The additional air flow quickly reduces the recirculating heating gas temperature to thereby essentially eliminate oil temperature "overshoot" problems. Accordingly, when the oil is rapidly brought to its operating temperature the inlet damper may simply be opened to very rapidly diminish the temperature differential between the recirculating heating gas and the cooking oil being heated. There are thus two ways to efficiently modulate the recirculating gas flow temperature—appropriate control of the burner gas inlet valve, and operation of the air inlet damper.

According to an important aspect of the present invention, sensors are used to continuously monitor both the cooking oil temperature and the recirculating heating gas temperature, and to generate output signals indicative of such temperatures. These output signals are transmitted to cooking control computer which outputs control signals used to appropriately cycle and control, among other cooking system elements, the burner igniter and gas supply valve, and the air inlet damper. This sensing and control scheme, via appropriate programming of the computer, may be utilized to regulate the recirculating heating gas temperature in a variety of manners as a function of sensed cooking oil temperature to prevent overheating and potential scorching of the cooking oil. For example, a predetermined maximum attainable temperature differential between the heating gas and the cooking oil could be established. Or, some other predetermined relationship between such temperatures could be established, and varied according to the needs of a particular cooking cycle. Alternatively, of course, a simple predetermined maximum attainable gas temperature could be established.

According to another feature of the present invention, the triangularly cross-sectioned heating tubes are interiorly provided, along lower side portions thereof, with rigid insulation sections which restrict the tube interior, thereby increasing gas flow velocity therethrough and accordingly increasing the heat transfer efficiency of the gas, and also shield the frypot "cold zone" (below the tubes) from downwardly directed tube heat.

While the frypot heating system of the present invention lends itself quite well to fuel-fired applications, it can also be easily be modified to utilize an electric heating source. For example, the fuel burner could be removed and replaced with appropriate electric heating elements disposed in the discharge plenum downstream from the fan impeller discharge. The cooking computer could then be used to control such electric heating elements instead of the burner igniter and gas supply valve.

BRIEF DESCRIPTION OF THE DRAWINGS

FIG. 4 is a cross-sectional view through the frypot taken along line 4—4 of FIG. 3;

FIG. 4A is a fragmentary cross-sectional view through an electrically heated version of the frypot;

FIG. 5 is a graph illustrating the relationship, as a function of time, between the gas fired frypot cooking oil temperature and the temperature of its recirculating heating gas temperature prior to, during, and just after the initiation of a cooking cycle.

DETAILED DESCRIPTION

Figure 1:
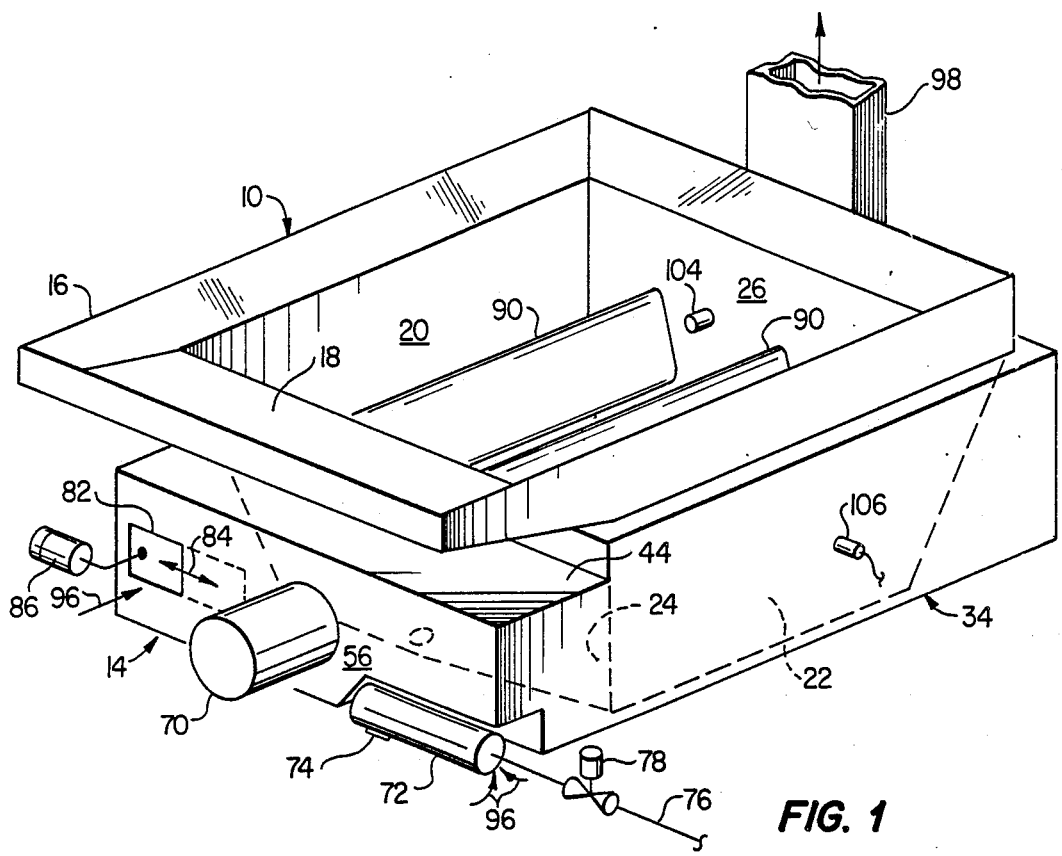
FIG. 1 is a partially schematic perspective view of a gas fired, high efficiency deep fat cooking frypot which embodies principles of the present invention.

Illustrated in FIGS. 1-4 is a metal, deep fat cooking frypot 10 which is adapted to receive a quantity of cooking oil 12 (FIG. 3) used to deep fat fry a variety of food items, such as chicken, fish, french fries or the like immersed therein. Operatively associated with the frypot 10, and functioning in a manner subsequently described, is a unique, recirculating gas flow oil heating system 14 that embodies principles of the present invention.

The frypot 10 has a body portion from which an upper front shelf portion 16, having a rearwardly and downwardly sloping lower wall 18, forwardly projects. The frypot body portion has, somewhat below its open top end, downwardly and inwardly sloped left and right side walls 20 and 22, front wall 24, and rear wall 26, such walls being joined at their lower side edges to a bottom wall 28 of the frypot body. Within the frypot 10, the oil 12 has an upper cooking zone 30 (FIG. 3) into which the food items to be cooked are immersed, and an appreciably cooler "cold zone" 32 positioned beneath such cooking zone.

The heating system 14 includes a rigid insulation structure 34 which exteriorly extends laterally around the side and rear walls 20, 22 and 26 of the frypot 10, generally above the cold zone 32, and projects forwardly of the front frypot wall 24 beneath the front shelf portion 16. Left, right, and rear interior side surface portions of the insulation structure 34 are appropriately recessed, as at 36 (FIG. 3), to define along the exterior side surfaces of the frypot walls 20, 22 and 26, respectively, horizontal left and right side heating passages 38 and 40, and a horizontal rear side heating passage 42 that communicates at its opposite ends with the rear ends of the side passages 38 and 40 (see FIG. 4).

Formed internally in the front portion 44 of the insulation structure 34 is a cavity 46 as best illustrated in FIG. 4. Metal baffle members 48 and 50 are disposed within the cavity 46 and subdivide it into a return plenum 52 projecting forwardly from a laterally central portion of the front frypot wall 24, an inlet plenum 54 extending rearwardly from the front insulation structure wall 56, and a discharge plenum 58 interposed between the plenums 52 and 54 and communicating at its opposite ends with the front ends of the side heating passages 38 and 40. For purposes later described, laterally central portions of the baffle members 48 and 50 are respectively provided with facing discharge openings 60 and 62.

The impeller 64 of a squirrel cage type centrifugal fan is interposed between the baffle members 48 and 50 and has an inlet 66, open at opposite sides thereof, which is generally aligned with and closely adjacent the plenum discharge openings 60 and 62. Impeller 64 is rotationally driven, via a shaft 68, by a motor 70 mounted externally on the front insulation structure wall 56.

Referring now to FIGS. 1 and 4, an induced draft type fuel-air burner 72, having an igniter 74, is extended upwardly through the bottom of the front insulation structure portion 40 into the inlet plenum 54. Fuel, representatively in the form of natural or manufactured gas, is supplied to the inlet of the burner 72 via a gas supply line 76 having a motorized control valve 78 operatively installed therein. Extending inwardly through the front insulation structure wall 56 is an ambient inlet opening 80 having a slide damper member 82 operatively mounted thereover for movement relative thereto as indicated by the double-ended arrow 84 in FIG. 1 to selectively cover or uncover the opening 80 as desired. Movement of the slide damper member 82 is controlled by the operation of a damper motor 86 operatively connected thereto.

Figure 3:
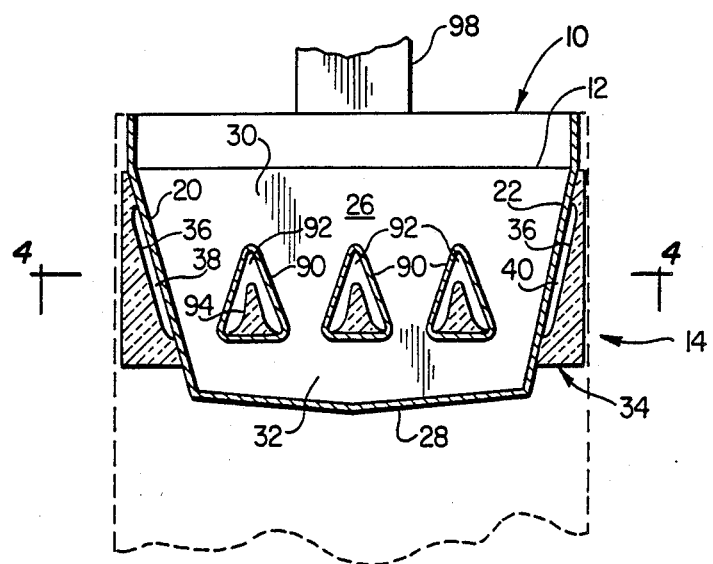
FIG. 3 is a cross-sectional view through the frypot taken along line 3—3 of FIG. 2, with the frypot shown operatively supported in an upper portion of a representative cooker housing illustrated in phantom.

Connected at their opposite ends to the front and rear frypot walls 24 and 26 are three laterally spaced, horizontally extending heating tubes 90 which intercommunicate the rear heating passage 42 with the return plenum 52 via heating passages 92 within the tubes 90. As best illustrated in FIG. 3, the tubes 90 have a generally triangular cross-section along their lengths. For purposes later described, elongated, generally triangularly cross-sectioned rib members 94, formed from a rigid insulation material, are interiorly secured to the base walls of the tubes 90 and give the tube heating passages 92 their generally inverted V-shaped configurations shown in FIG. 3.

During operation of the heating system 14, rotation of the fan impeller 64 draws ambient air 96 and gas from the supply line 76 inwardly through the burner 72, the resulting gas-air mixture being ignited by the igniter 74 to thereby discharge hot combustion gas into the inlet chamber 54. As indicated by the arrows in FIG. 4, this combustion gas is drawn into the inlet plenum side of the impeller inlet 66 and is then discharged from the impeller into the discharge chamber 58. The hot combustion gas is then flowed rearwardly through the side heating passages 38 and 40, flowed inwardly through the opposite ends of the opposite ends of the rear heating passage 42, and then flowed forwardly through the tube passages 92 into the return plenum 52. From the return plenum 52, the hot combustion gas is drawn into the return plenum side of the impeller inlet 66 where it is mixed with combustion gas emanating from the burner 72, the resulting incoming and returning combustion gas mixture being discharged into the discharge chamber 58 and forced through the previously described passageway system back into the fan impeller inlet 66.

It can be seen that a recirculating heating gas flow path is sequentially defined by the discharge plenum 58, the side heating passages 38 and 40, the rear heating passage 42, the tube passages 92, and the return plenum 52. Excess gas introduced into this recirculating passageway (i.e., the fuel-air mixture volume entering the inlet plenum 54) is discharged through a vent stack 98 positioned at the rear of the frypot and communicating with the rear heating passage 42.

The recirculating combustion gas mixture flowing through the passageway system just described transmits heat into the cooking oil 12 through a very high heat influx area defined by the walls of the heating tubes 90, which are disposed in a lower portion of the cooking zone 30, and portions of the four sloping side walls of the frypot. This large heating influx area provides for very rapid heating of the cooking oil, and simultaneously heats both peripheral and interior portions of the oil to their evenly heat it in a manner substantially eliminating undesirable temperature gradients in the cooking zone portion thereof.

It will be appreciated that the combustion gas which traverses the recirculation flow passage from the discharge plenum 58 to the return plenum 52 and back into the fan impeller 64 is at a considerably lower temperature than the combustion gas originally emanating from the burner 72 and delivered to the fan impeller for mixture with return gas. Since the combustion gas returned to the fan is at a considerably lower temperature than the initial burner-generated gas, the resulting gas mixture discharged by the fan impeller into the discharge chamber 58 is also at a significantly lower temperature than the combustion gas initially generated by the burner.

Accordingly, the primary heat influx wall portions of the frypot are, in effect, shielded from the high flame temperature of the burner, the burner flame being isolated from such surfaces by the interposition of the return and discharge plenums 54 and 58 between the inlet plenum 54 (which serves as a combustion chamber) and the frypot body, and the "tempering" of the initially generated combustion gas arising from its mixture with return flow from the continuously recirculating combustion gas as previously described.

Such protective tempering greatly lessens the possibility that cooking oil at the periphery of the frypot interior will be scorched—even when the burner is being operated at its maximum firing rate. This desirable tempering effect may be selectively augmented simply by opening the air inlet damper 82 to cause a significantly larger amount of ambient air 96 (i.e., beyond that drawn inwardly through the burner) to be drawn into the inlet chamber 54. The additional air flow quickly reduces the recirculating heating gas temperature to thereby essentially eliminate oil temperature "overshoot" problems. Accordingly, when the oil is rapidly brought to its operating temperature, the inlet damper may be simply be opened to very rapidly diminish the temperature differential between the recirculating heating gas and the cooking oil being heated. There are thus two ways to efficiently modulate the recirculating gas flow temperature—appropriate control of the burner gas inlet valve 78, and operation of the air inlet damper 82.

A representative illustration of this operational capability is presented in the graph of FIG. 5 in which the heating oil temperature is plotted against the recirculating heating gas temperature, as a function of time, prior to, during, and just after the initiation of a typical cooking cycle. It can be seen that after the cooking oil temperature has been raised from a starting temperature $T_1$ to a "standby" temperature $T_s$, the cooking oil temperature may be rapidly raised to an operating temperature $T_0$ by increasing the recirculating heating gas temperature to a maximum temperature $T_m$ to thereby establish a temperature differential $\Delta T$ between the recirculating heating gas temperature and the operating temperature to which the cooking oil has just been brought. The sharp dip 100 in the solid line oil temperature curve represents the initial cooking oil temperature drop which occurs immediately after the food items to be cooked have been initially immersed in the oil. The subsequent rise again to the operating temperature $T_0$ represents the rapid return of the oil to its operating temperature brought about by maintaining the recirculating heating gas temperature at its maximum value $T_m$.

At or just before the point in time at which the oil returns to its operating temperature, (i.e., point 102 on the heating gas temperature curve) the air inlet damper 82 is opened to very rapidly decrease the recirculating heating gas temperature to a sustaining temperature $T_x$ just slightly above the operating temperature $T_0$ of the oil. This unique ability to so rapidly cool the heating gas flow functions to advantageously prevent the oil temperature from "overshooting" its operating temperature as the oil is heated toward such operating temperature after the food items have initially been immersed therein.

Figure 6:
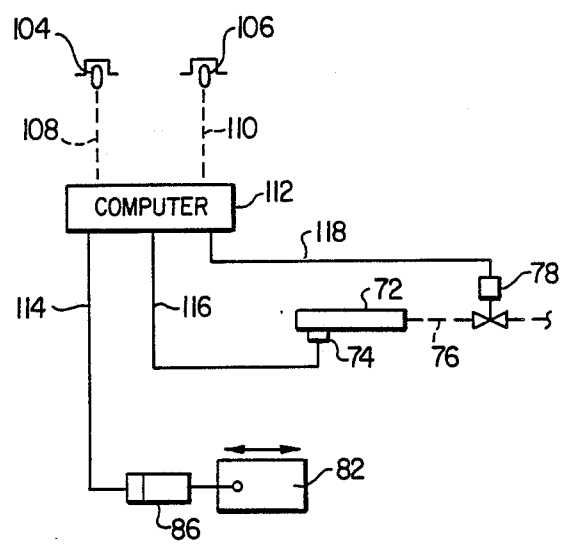
FIG. 6 is a schematic control diagram representatively illustrating the automatic control of the frypot gas burner, gas inlet valve and fresh air inlet damper.
Figure 2:
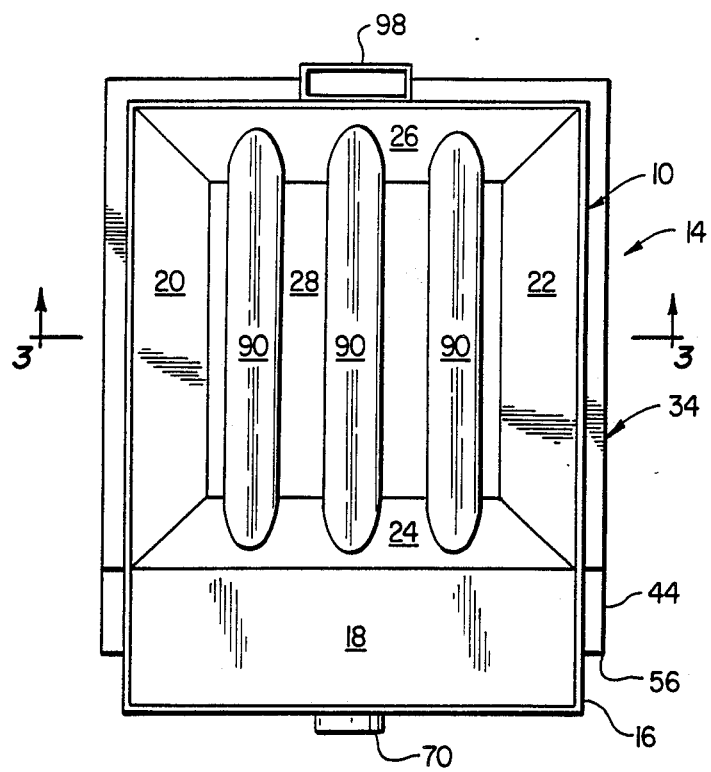
FIG. 2 is a top plan view of the frypot.

Referring now to FIGS. 1 and 6, according to an important aspect of the present invention, an oil temperature sensor 104 is extended inwardly through the rear frypot wall 26 into the cooking zone, and a gas temperature sensor 106 is inserted inwardly into the right side heating passage 40. Sensors 104, 106 responsively generate output signals 108, 110 which are indicative of the oil and gas temperatures and are transmitted to a cooking computer 112 that responsively generates control signals 114, 116 and 118 which respectively control the operation of the damper motor 86, the burner igniter 74, and the gas control valve 78.

This relatively simple sensing and control system, via appropriate programming of the computer 112, may be utilized to regulate the recirculating heating gas temperature in a variety of manners as a function of the sensed cooking oil temperature to prevent overheating and potential scorching of the cooking oil.

For example, a predetermined maximum attainable temperature differential between the heating gas and the cooking oil could be established. Or, some other predetermined relationship between such temperatures could be established and varied according to the needs of a particular cooking cycle. Alternatively, of course, a simple predetermined maximum attainable gas temperature could be established. While the dotted gas temperature line in FIG. 5 is illustrated as being at all times above the solid oil temperature line, it will be appreciated that, particularly just after ambient air is admitted to the inlet plenum 54, the gas temperature line could, if desired, be made to dip below the oil temperature line (at lest for a relatively short period) to further assist in preventing oil temperature overshoot.

Returning again to FIG. 3, it will be noted that the side heating passages 38 and 40 (like the rear heating passage 42) are relatively narrow. This narrow passage configuration maintains the combustion gas flow through such passages at a relatively high velocity to thereby generally maximize the heat transfer efficiency to the cooking oil of such combustion gas. While the laterally outer side surfaces of the passages 38, 40 and 42 are indicated as being essentially flat, they could also be provided, if desired, with a wavy configuration to induce turbulence in the combustion gas flow through the passages to further enhance the aforementioned heat transfer efficiency.

As previously mentioned, the insulation material rib members 94 disposed within the interiors of the heating tubes 90 function to restrict the combustion gas flow therethrough, thereby similarly increasing the velocity of such gas flow and improving the heat transfer efficiency of the gas. The ribs 94, as illustrated in FIG. 3, also extend at their lower sides along substantially the entire interior surface of the lower base walls of the heating tubes. This advantageously operates to shield to a large degree the "cold zone" 32 from downwardly directed tube heat and, in effect, "focuses" the tube heat upwardly and laterally outwardly into the cooking zone 30.

While the previously described frypot heating system 14 of the present invention lends itself quite well to fuel-fired applications, it can also be easily modified to utilize an electric heating source. As representatively illustrated in the alternate embodiment $14_a$ of the heating system depicted in FIG. 4A. In such alternate embodiment, the fuel burner 72 is simply deleted and replaced with electric resistance heating coils 120 operatively disposed within the discharge plenum 58 on opposite sides of the fan impeller 64. Using this electric heating format, heated air, instead of combustion gas, would be continuously recirculated through the previously described heating passageway system. To rapidly reduce the temperature of the recirculated, heated air, the damper 82 could simply be opened as previously described in conjunction with the gas-fired frypot heating system. The control circuit schematically illustrated in FIG. 6 could be modified to accommodate this electric heating version simply by using appropriate control signals from the computer to control the operation of the resistance type electric heating elements 120 instead of the burner igniter and gas valve.

The foregoing detailed description is to be clearly understood as being given by way of illustration and example only, the spirit and scope of the present invention being limited solely by the appended claims.

What is claimed is:

1. Deep fat cooking frypot apparatus comprising:
   a frypot adapted to receive a quantity of cooking fluid;
   wall means carried by said frypot for defining a recirculating flow passage thermally communicating with an oil-receiving interior portion of said frypot;
   means for generating heated gas; and
   fan means having an inlet and being operable to sequentially;
      draw a first portion of the generated gas into said inlet,
      discharge said first generated gas portion into and through said flow passage to transfer heat from said first generated gas portion to the cooking fluid,
      return said first generated gas portion to said inlet at a reduced temperature,
      mix the returned first generated gas portion with a second generated gas portion being initially drawn into said inlet to form from said first and second generated gas portions a gas mixture having a lower temperature than that of said second generated gas portion, and
      discharge said gas mixture into and through said flow passage, and then back to said inlet.

2. The frypot apparatus of claim 1 further comprising:
   means for admitting a selectively variable quantity of cooling gas to said flow passage to adjustably lower than temperature of said gas mixture.

3. A heating system for heating cooking fluid disposed within a cooking vessel such as a frypot or the like, said heating system comprising:
   wall means carried by the vessel and defining thereon a recirculating heating flow passageway system through which heated gas may be flowed to transfer heat therefrom into the cooking fluid, said passageway system having a first section extending along an exterior surface portion of the vessel, and a second section communicating with said first section and extending through the interior of the vessel;
   fan means for creating within said passageway system a recirculating flow of gas which is continuously discharged from the fan, flows through the passageway system, and then reenters the fan; and
   means for selectively adding heat to the recirculating gas flow to regulate its temperature.

4. The heating system of claim 3 wherein:
   said means for selectively adding heat include an electric heating element operatively disposed in said passageway system.

5. The heating system of claim 3 wherein:
   said means for selectively adding heating include fuel-fired burner means for generating hot combustion gas, and
   said fan means are operative to draw hot combustion gas thereinto for mixture therein with recirculated gas and discharge the mixed hot combustion gas and recirculated gas into said passageway system.

6. The heating system of claim 3 wherein:
   the cooking vessel has a generally vertically disposed sidewall portion, and
   said first section of said passageway system extends externally along said generally vertically disposed sidewall portion.

7. A heating system for heating cooking fluid disposed within a cooking vessel such as a frypot or the like, said heating system comprising:
   wall means carried by the vessel and defining thereon a recirculating heating low passageway system through which heated gas may be flowed to transfer heat therefrom into the cooking fluid,
   fan means for creating within said passageway system a recirculating flow of gas which is continuously discharged from the fan, flows through the passageway system, and then re-enters the fan; and
   means for selectively adding heat to the recirculating gas flow to regulate its temperature,
   said means for selectively adding heat including fuel-fired burner means for generating hot combustion gas, and
   said fan means being operative to draw said hot combustion gas thereinto for mixture therein with recirculated gas and discharge the mixed hot combustion gas and recirculated gas into said passageway system.

8. A heating system for heating cooking fluid disposed within a cooking vessel such as a frypot or the like, said heating system comprising:
   wall means carried by the vessel and defining thereon a recirculating heating flow passageway system through which heated gas may be flowed to transfer heat therefrom into the cooking fluid;
   fan means for creating within said passageway system a recirculating flow of gas which is continuously discharged from the fan, flows through the passageway system, and then re-enters the fan;
   means for selectively adding heat to the recirculating gas flow to regulate its temperature; and
   means for admitting a selectively variable quantity of ambient air to said recirculating gas flow to reduce the temperature thereof.

9. A method of heating cooking fluid disposed within a frypot or the like, said method comprising the steps of:
   forming a heating flow passageway system which extends along and communicates with an exterior surface portion of the frypot;
   providing a combustion chamber spaced apart from said exterior surface portion;
   utilizing a fuel-fired burner to introduce a flame and hot combustion gas into said combustion chamber;
   utilizing a fan to flow the hot combustion gas through said passageway system to thereby transfer heat from the combustion gas into the cooking fluid; and
   isolating said exterior surface portion of the frypot from said flame by using said fan to recirculate combustion gas within said passageway system and mix the recirculated combustion gas with combustion gas generated by said burner.

* * * * *

UNITED STATES PATENT AND TRADEMARK OFFICE
CERTIFICATE OF CORRECTION

PATENT NO. : 4,898,151

DATED : February 6, 1990

INVENTOR(S) : Clement J. Luebke, et al.

It is certified that error appears in the above-identified patent and that said Letters Patent is hereby corrected as shown below:

Col. 4, line 19, "interior," should be --interiors,--

Col. 9, line 38, "than" should be --the--

Col. 9, line 63, "heating" should be --heat--

Col. 10, line 15, "low" should be --flow--

Signed and Sealed this

Twenty-fourth Day of September, 1991

Attest:

HARRY F. MANBECK, JR.

Attesting Officer

Commissioner of Patents and Trademarks